(12) United States Patent
Iino et al.

(10) Patent No.: US 10,644,565 B2
(45) Date of Patent: May 5, 2020

(54) VIBRATION GENERATION DEVICE AND ELECTRONIC DEVICE

(71) Applicant: SEIKO INSTRUMENTS INC., Chiba-shi, Chiba (JP)

(72) Inventors: Akihiro Iino, Chiba (JP); Masao Kasuga, Chiba (JP)

(73) Assignee: SEIKO INSTRUMENTS INC. (JP)

( * ) Notice: Subject to any disclaimer, the term of this patent is extended or adjusted under 35 U.S.C. 154(b) by 73 days.

(21) Appl. No.: 15/894,612

(22) Filed: Feb. 12, 2018

(65) Prior Publication Data
US 2018/0241280 A1   Aug. 23, 2018

(51) Int. Cl.
| G04B 47/00 | (2006.01) |
| H02K 7/075 | (2006.01) |
| H02K 7/06 | (2006.01) |
| B06B 1/16 | (2006.01) |
| H02K 5/167 | (2006.01) |
| H02K 1/27 | (2006.01) |
| H02K 1/28 | (2006.01) |
| H02K 7/08 | (2006.01) |

(52) U.S. Cl.
CPC .............. *H02K 7/075* (2013.01); *B06B 1/16* (2013.01); *G04B 47/00* (2013.01); *H02K 1/2793* (2013.01); *H02K 1/28* (2013.01); *H02K 5/1677* (2013.01); *H02K 7/063* (2013.01); *H02K 7/086* (2013.01); *H02K 2205/03* (2013.01)

(58) Field of Classification Search
CPC .................................. G04B 47/00; H02K 7/075
See application file for complete search history.

(56) References Cited

U.S. PATENT DOCUMENTS

| 2007/0223318 A1* | 9/2007 | Nobs ...................... G04B 45/02 |
| | | 368/204 |
| 2010/0289357 A1 | 11/2010 | An et al. ......................... 310/81 |
| 2011/0298320 A1 | 12/2011 | Kim ............................... 310/71 |

FOREIGN PATENT DOCUMENTS

JP     5921743     5/2016

OTHER PUBLICATIONS

European Search Report dated Jun. 28, 2018 in Application No. EP 18 15 6656.

* cited by examiner

*Primary Examiner* — Edwin A. Leon
*Assistant Examiner* — Jason M Collins
(74) *Attorney, Agent, or Firm* — Adams & Wilks (57) ABSTRACT

A vibration generation device includes a rotor rotatable about a rotation axis, the rotor including a weight having a center of gravity that is eccentric with respect to the rotation axis. A shaft is inserted into the rotor and rotatably supports the rotor. A restriction part is disposed further inward than the weight in a radial direction, the restriction part being attached to one end of the shaft for restricting movement of the rotor in an axial direction.

11 Claims, 4 Drawing Sheets

VIBRATION GENERATION DEVICE AND ELECTRONIC DEVICE

BACKGROUND OF THE INVENTION

Field of the Invention

The present invention relates to a vibration generation device and an electronic device. Priority is claimed on Japanese Patent Application No. 2017-029687 filed on Feb. 21, 2017, and Japanese Patent Application No. 2017-222993, filed on Nov. 20, 2017. Contents of both the Japanese Patent Applications are incorporated herein by reference.

DESCRIPTION OF RELATED ART

In the related art, in electronic devices such as mobile phones, vibration is used as a means for informing that there is an incoming call, various types of information, and the like to a user. In order to generate this vibration, a vibration generation device (vibration motor) is used (for example, refer to Japanese Patent No. 5921743).

A vibration generation device of Japanese Patent No. 5921743 includes a rotor, a stator that supports rotation of the rotor, and a cover that houses the rotor and the stator. The rotor is externally fitted to a shaft of the stator. The rotor has an eccentric weight that causes the center of gravity of the rotor to be eccentric. The cover covers the rotor and the stator from at least one side in the axial direction and from the outer side in the radial direction, in a state in which an inner surface of the cover is attached by one end of the shaft.

In the vibration generation device of Japanese Patent No. 5921743, when the rotor rotates, a centrifugal force of the weight causes generation of vibration. In the vibration generation device of Japanese Patent No. 5921743, since the inner surface of the cover is in contact with one end of the shaft, movement of the rotor in the axial direction is restricted and the rotor is prevented from being separated from the shaft.

SUMMARY OF THE INVENTION

Technical Problem

However, in the vibration generation device of Japanese Patent No. 5921743, the cover prevents the rotor from being separated from the shaft. However, the thickness (the size in the axial direction) of the vibration generation device is increased by the thickness of the cover and a gap between the cover and the rotor.

The present invention has been made in view of the above problems and an object of the present invention is to provide a vibration generation device and an electronic device whose thicknesses can be reduced.

Solution to Problem

According to an aspect of the present invention, a vibration generation device includes a rotor that is configured to be rotatable about a rotation axis and includes a weight having a center of gravity that is eccentric with respect to the rotation axis; a shaft that is inserted into the rotor and rotatably supports the rotor; and a restriction part that is disposed further inward than the weight in a radial direction, is attached to one end of the shaft, and configured to restrict a movement of the rotor in an axial direction.

According to the aspect of the present invention described above, it is possible to prevent the rotor from being separated from the shaft without using the cover as in the vibration generation device of the related art. Accordingly, since the cover is not disposed, the vibration generation device according to the aspect described above can be configured with a smaller thickness compared to a vibration generation device of the related art. As a result, it is possible to reduce the thickness of the vibration generation device.

In the above vibration generation device according to the aspect described above, the restriction part is preferably disposed at or below a height of the rotor with respect to the other end of the shaft.

According to the aspect described above, since the restriction part does not project outwardly further than the rotor, the thickness of the vibration generation device can be further set to be thinner. Accordingly, it is possible to further reduce the thickness of the vibration generation device.

In the vibration generation device according to the aspect described above, one end of the shaft is preferably disposed at or below a height of the rotor with respect to the other end of the shaft.

According to the aspect described above, since the shaft does not project outwardly further than the rotor, the thickness of the vibration generation device can be further set to be thinner. Accordingly, it is possible to further reduce the thickness of the vibration generation device.

In the vibration generation device according to the aspect described above, the rotor preferably includes a back yoke to which the weight is attached, and part of the restriction part preferably faces the back yoke in the axial direction.

According to the aspect described above, when the rotor moves in the axial direction, the back yoke comes directly in contact with the restriction part. Accordingly, for example, compared to a configuration in which movement of the bearing interposed between the back yoke and the shaft is restricted by the restriction part, the vibration generation device is configured to be able to restrict a movement of the rotor in the axial direction at a position closer to the weight (that is, a position away from the shaft in the radial direction). Accordingly, it is possible to reliably prevent the rotor from being separated from the shaft.

In the vibration generation device according to the aspect described above, the weight is preferably provided at the highest position in the rotor with respect to the other end of the shaft.

According to the aspect described above, since an installation range of the weight increases, it is possible to enlarge the weight. Accordingly, in the vibration generation device according to the aspect described above, a centrifugal force of the weight applied on the rotating rotor increases. As a result, it is possible to achieve the both goals of reducing the thickness of the vibration generation device and increasing the vibration.

The vibration generation device according to the aspect described above preferably includes a support plate that supports the other end of the shaft, and the support plate preferably includes a small diameter part whose size from the rotation axis to an end of the outer side in the radial direction is smaller than a maximum radius of the rotor.

According to the aspect described above, the vibration generation device can be configured with a space for disposing other device outward from the small diameter part in the radial direction. Accordingly, it is possible to reduce the size of the device in which the vibration generation device is mounted.

The vibration generation device according to the aspect described above preferably includes a support plate that supports the other end of the shaft, and the support plate preferably includes a large diameter part whose size from the rotation axis to an end of the outer side in the radial direction is larger than a maximum radius of the rotor.

According to the aspect described above, since the large diameter part projects further than the rotor when viewed in the axial direction, when the vibration generation device is attached to a device on which it is to be mounted, the vibration generation device can be easily held by gripping the large diameter part. As a result, it is possible to configure a vibration device that can be easily attached to the device on which it is to be mounted.

In the vibration generation device according to the aspect described above, the support plate preferably includes a projection that stands up from the large diameter part in a thickness direction of the support plate.

According to the aspect described above, when the large diameter part is gripped, the projection is easily caught by a finger, tweezers, or the like such that the vibration generation device can be easily held. As a result, it is easy to perform an attachment to the device on which it is to be mounted.

An electronic device according to an aspect of the present invention includes the vibration generation device according to the aspect described above.

According to the aspect described above, the thinned vibration generation device is included such that it is possible to reduce the thickness of the electronic device.

The electronic device according to the aspect described above preferably includes a visual recognition part that is visually recognizable from the outside and an opening that is provided in the visual recognition part, and the rotor is preferably disposed in the opening.

According to the aspect described above, the electronic device can make the user recognize the rotation of the rotor. Accordingly, the electronic device can communicate information to the user visually while using the vibration. As a result, the electronic device can improve a function of communicating information to the user.

In the above electronic device according to the aspect described above, part of at least one of the rotor and the shaft preferably projects from the visual recognition part to the outside.

According to the aspect described above, compared to a configuration in which the rotor and the shaft do not project from the visual recognition part to the outside, since the thickness of a portion of the electronic device that is positioned on the back side of the visual recognition part within the rotor and the shaft is reduced, it is possible to reduce the thickness of the electronic device including the vibration generation device.

Advantageous Effects of Invention

According to the aspects of the present invention described above, it is possible to reduce the thicknesses of the vibration generation device and the electronic device.

DETAILED DESCRIPTION OF THE INVENTION

Embodiments of the present invent ion will be described below with reference to the drawings. Here, in the following description, components having the same or similar functions are denoted by the same reference numerals. Accordingly, redundant descriptions thereof will be omitted.

First Embodiment

A watch 1 (electronic device) according to a first embodiment of the present invention will be described.

Figure 1:
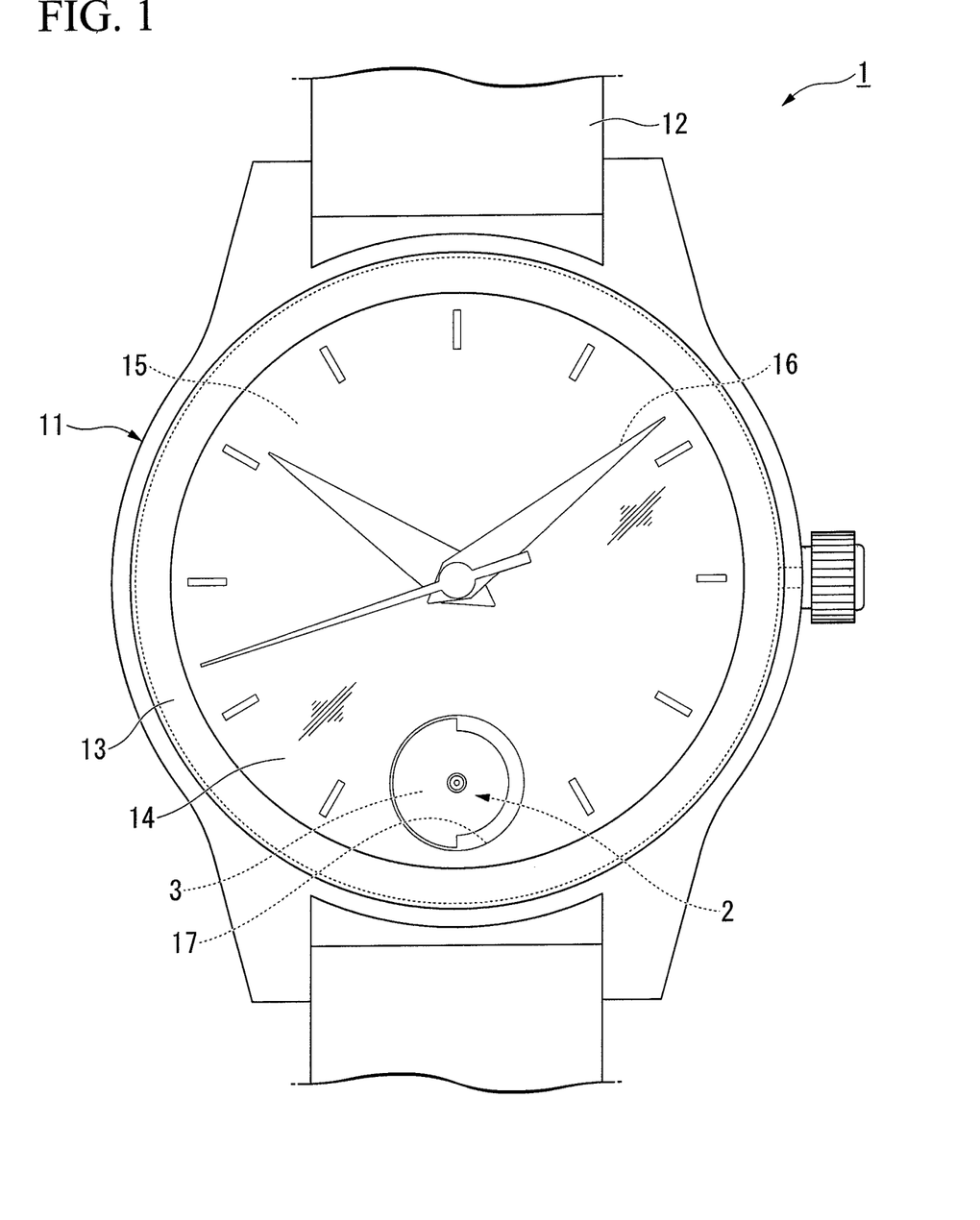
FIG. 1 is a plan view of a watch according to a first embodiment of the present invention.

FIG. 1 is a plan view of the watch 1.

As shown in FIG. 1, the watch 1 is a wristwatch-type and analog-type electronic watch. The watch 1 includes a watch main body 11 and a band 12 that is attached to the watch main body 11.

The watch mainbody 11 includes a case 13, a glass 14 provided on a surface of the case 13, the dial plate 15 (visual recognition part) provided inside the glass 14, and watch components provided in the case 13. The dial plate 15 is visible from the outside through the glass 14. On the dial plate 15, numbers for indicating a time and the like are clearly displayed. On the dial plate 15, a plurality of hands 16 (hour hand, minute hand and second hand) are rotatably disposed. A hole 17 (opening) is provided in the dial plate 15.

A movement and a vibration generation device 2 are accommodated in the case 13 as watch components. The movement includes a drive unit, a battery, and the like, and controls driving of the plurality of hands 16. In the vibration generation device 2, a rotor 3 to be described below is disposed in the hole 17.

Figure 2:
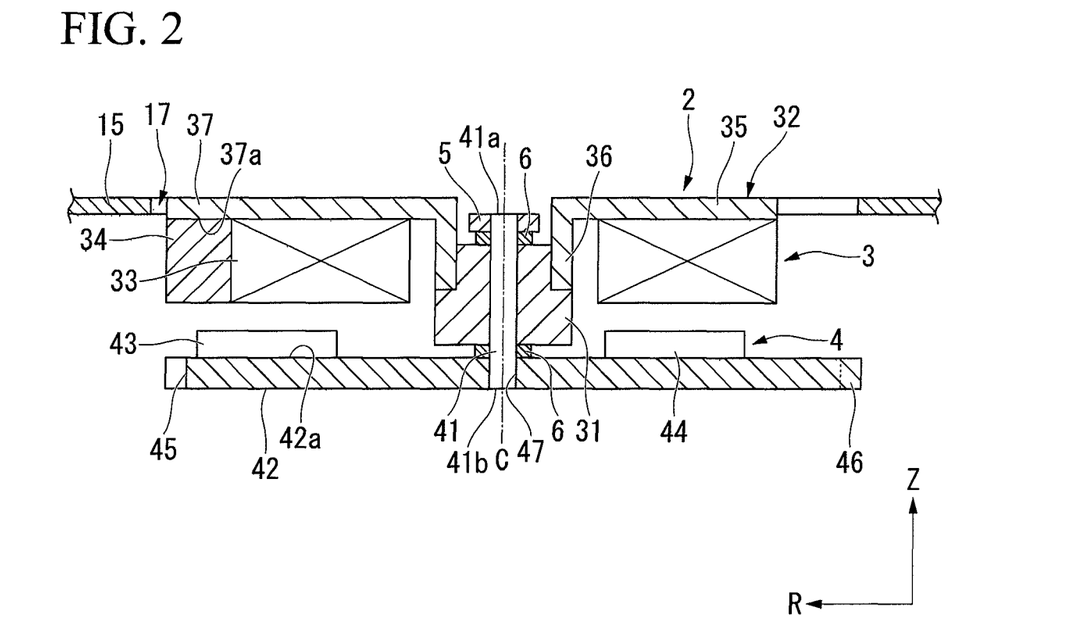
FIG. 2 is a schematic cross-sectional view of a vibration generation device according to the first embodiment.

FIG. 2 is a schematic cross-sectional view of a vibration generation device according to the first embodiment.

As shown in FIG. 2, the vibration generation device 2 is a brushless vibration generation device (brushless motor). The vibration generation device 2 includes the rotor 3, a stator 4, and a restriction part 5. In the following description, a rotation axis C direction of the rotor 3 will be referred to as an axial direction with a suffix of a sign Z and a direction (that is, the radial direction of the rotor 3) that is orthogonal to the axial direction Z and extends radially from the rotation axis C will be referred to as a radial direction with a sign R. A circumferential direction with respect to the rotation axis C will be simply referred to as a circumferential direction.

The rotor 3 includes a bearing 31, a back yoke 32, a magnet 33, and a weight 34. When viewed in the radial direction R, at least part of the rotor 3 is disposed in the hole 17 of the dial plate 15. The rotor 3 may be disposed in the hole 17 so that it projects from the dial plate 15 toward the glass 14.

The bearing 31 is, for example, a sliding bearing such as an oil-retaining bearing. The bearing 31 is formed in a cylindrical shape and disposed coaxially with the rotation axis C.

The back yoke 32 includes a yoke main body 35 that is formed in an annular shape, a fitting tube 36 that extends from an inner peripheral edge of the yoke main body 35, and an attachment part 37 that extends from an outer peripheral edge of the yoke main body 35, and these are integrally formed. The yoke main body 35 is formed in an annular plate shape that is orthogonal to the axial direction Z and the yoke main body 35 is disposed coaxially with the rotation axis C. The yoke main body 35 is disposed on one side (the upper side shown in FIG. 2) of the bearing 31 in the axial direction Z. The fitting tube 36 extends from the inner peripheral edge of the yoke main body 35 toward the other side (the lower side shown in FIG. 2) in the axial direction Z. The fitting tube 36 is formed in a cylindrical shape. An end of one side of the bearing 31 in the axial direction Z is fitted into the fitting tube 36. The attachment part 37 extends from part of the outer peripheral edge of the yoke main body 35 toward the outer side in the radial direction R. The attachment part 37 is formed to correspond to the shape of the weight 34 and is formed in a fan shape with a central angle of about 180°.

The magnet 33 is provided on the main surface 37a that faces the other side in the axial direction Z in the yoke main body 35 of the back yoke 32.

The weight 34 is provided outward from the magnet 33 in the radial direction R on a main surface 37a that faces the other side of the attachment part 37 of the back yoke 32 in the axial direction Z. The weight 34 is formed in a fan shape centered on the rotation axis C. The weight 34 is formed so that a central angle when viewed in the axial direction Z is, for example, about 180°. Accordingly, the center of gravity of the weight 34 is eccentric with respect to the rotation axis C. The size of the weight 34 in the axial direction Z is substantially the same as the size of the magnet 33 in the axial direction Z. As a material of the weight 34, tungsten which is a metal with a high specific gravity is used. The weight 34 is fixed to the main surface 37a of the attachment part 37 by, for example, an adhesive or welding.

The stator 4 includes a shaft 41, a base part 42 (support plate), a coil 43, and a drive part 44.

The shaft 41 is disposed coaxially with the rotation axis C. The shaft 41 is inserted and fitted into the bearing 31 so that it is relatively rotatable with respect to the bearing 31. Accordingly, the shaft 41 rotatably supports the rotor 3. The shaft 41 includes a first end 41a (one end) on one side in the axial direction Z and a second end 41b (the other end) on the other side in the axial direction Z. The first end 41a of the shaft 41 is disposed at or below a height of the rotor 3 with respect to the second end 41b of the shaft 41. That is, in the axial direction Z, the first end 41a of the shaft 41 is disposed at the same position as an end of one side of the rotor 3, or at the other side with respect to the end of the one side of the rotor 3. In the present embodiment, the first end 41a of the shaft 41 is disposed below the rotor 3 with respect to the second end 41b of the shaft 41. That is, the first end 41a of the shaft 41 is disposed on the other side in the axial direction Z relative to an end of one side of the rotor 3 in the axial direction Z.

The base part 42 is disposed on the side opposite to the yoke main body 35 of the back yoke 32 with the magnet 33 in the axial direction Z therebetween. The base part 42 is attached to a circuit board (not shown) or the like disposed in the case 13 (refer to FIG. 1). The base part 42 is formed in a disk shape that is orthogonal to the axial direction Z. The base part 42 includes a small diameter part 45 and a large diameter part 46. The small diameter part 45 is provided in part of the base part 42 in the circumferential direction. The small diameter part 45 is formed so that a size from the rotation axis C to an end of the outer side in the radial direction R is smaller than a maximum radius of the rotor 3. The large diameter part 46 is part of the base part 42 in the circumferential direction and is provided at a place that is different from the small diameter part 45. The large diameter part 46 is formed so that a size from the rotation axis C to an end of the outer side in the radial direction R is larger than the maximum radius of the rotor 3. A shaft support hole 47 is formed at a center part of the base part 42. The shaft support hole 47 is formed coaxially with the rotation axis C. The second end 41b on the other side of the shaft 41 in the axial direction Z is relatively non-rotatably inserted into the shaft support hole 47.

The coil 43 is provided on a main surface 42a that faces the magnet 33 of the rotor 3 in the base part 42.

The drive part 44 is provided on the main surface 42a of the base part 42. The drive part 44 is connected to an external power supply. The drive part 44 is electrically connected to the coil 43. The drive part 44 includes a Hall element (not shown). The drive part 44 detects a polarity of the magnet 33 provided in the rotor 3 with the Hall element, controls a current supplied from an external power supply according to the detected polarity, and supplies the current to the coil 43. When the current is supplied to the coil 43, a magnetic force is generated in the coil 43. According to an interaction between the magnetic force generated in the coil 43 and a magnetic force of the magnet 33, the rotor 3 rotates about the rotation axis C. Accordingly, in the rotor 3, a centrifugal force of the weight 34 causes generation of vibration.

The restriction part 5 restricts movement of the rotor 3 in the axial direction Z. The restriction part 5 is, for example, a nut. The restriction part 5 is fixed to the first end 41a of the shaft 41. Accordingly, the restriction part 5 restricts movement of the rotor 3 in the axial direction Z to one side (side opposite to the stator 4). The restriction part 5 is disposed inward from the weight 34 of the rotor 3 in the radial direction R. The restriction part 5 is disposed in the fitting tube 36 of the back yoke 32. The restriction part 5 is disposed at or below a height of the rotor 3 with respect to the second end 41b of the shaft 41. That is, in the axial direction Z, an end of one side of the restriction part 5 is disposed at the same position as an end of one side of the rotor 3, or at the other side with respect to the end of the one side of the rotor 3. In the present embodiment, the restriction part 5 is disposed below the rotor 3 with respect to the second end 41b of the shaft 41. That is, the restriction part 5 is disposed on the other side in the axial direction Z relative to an end of one side of the rotor 3 in the axial direction Z.

A sliding ring 6 is disposed between the restriction part 5 and the bearing 31, and between the bearing 31 and the base part 42. The sliding ring 6 is formed in an annular shape. The outer diameter of the sliding ring 6 is set to be equal or smaller than the outer diameter of an end surface that faces the sliding ring 6 in the bearing 31. The sliding ring 6 is inserted onto the shaft 41 so that the sliding ring 6 and the shaft 41 are fitted with each other. The sliding ring 6 is a member for making the bearing 31 smoothly rotate. Specifically, the sliding ring 6 is made of only a resin material having slipperiness such as polyacetal or nylon, or made of a material obtained by adding a solid lubricant, for example, polytetrafluoroethylene or an ultra-high-molecular-weight polyethylene, to the resin.

The vibration generation device 2 according to the present embodiment includes the restriction part 5 that is disposed further inward than the weight 34 in the radial direction R, and attached to the first end 41*a* of the shaft 41 for restricting a movement of the rotor 3 in the axial direction Z. Accordingly, without using a cover as in the vibration generation device of the related art, it is possible to prevent the rotor 3 from being separated from the shaft 41. Accordingly, the vibration generation device 2 according to the present embodiment can be configured with a smaller thickness (the dimension in the axial direction Z) since the cover is not disposed compared to the vibration generation device of the related art. Accordingly, it is possible to reduce the thickness of the vibration generation device 2.

According to the present embodiment, since it is possible to omit the cover unlike the vibration generation device of the related art, the size of an external form of the vibration generation device 2 when viewed in the axial direction Z can be reduced since the cover is not disposed at an outward side in the radial direction R of the rotor 3, compared to the vibration generation device of the related art.

According to the present embodiment, since the configuration of the cover can be omitted, it is possible to enlarge the magnet 33 and the coil 43 while preventing the size of the vibration generation device 2 from increasing. Accordingly, it is possible to increase a torque of the vibration generation device 2. As a result, the vibration generation device 2 according to the present embodiment can easily generate a vibration.

According to the present embodiment, since the configuration of the cover can be omitted, it is possible to reduce overall costs by reducing the cost of components.

The restriction part 5 of the vibration generation device 2 according to the present embodiment is disposed below the rotor 3 with respect to the second end 41*b* of the shaft 41. Accordingly, it is possible to further reduce the thickness of the vibration generation device 2 since the restriction part 5 does not project further outwardly with respect to the rotor 3. As a result, it is possible to further reduce the thickness of the vibration generation device 2.

The first end 41*a* of the shaft 41 of the vibration generation device 2 according to the present embodiment is disposed below the rotor 3 with respect to the second end 41*b* of the shaft 41. Accordingly, it is possible to further reduce the thickness of the vibration generation device 2 since the shaft 41 does not project further outwardly with respect to the rotor 3. As a result, it is possible to further reduce the thickness of the vibration generation device 2.

The base part 42 of the vibration generation device 2 according to the present embodiment includes the small diameter part 45 whose size from the rotation axis C to an end of the outer side in the radial direction R is smaller than the maximum radius of the rotor 3. It is possible to provide a space in which other device (watch component) is disposed outward from the small diameter part 45 in the radial direction R. Accordingly, it is possible to reduce the size of the watch 1 (the watch main body 11) in which the vibration generation device 2 is mounted.

The base part 42 of the vibration generation device 2 according to the present embodiment includes the large diameter part 46 whose size from the rotation axis C to an end of the outer side in the radial direction R is larger than the maximum radius of the rotor 3. Since the large diameter part 46 projects further than the rotor 3 when viewed in the axial direction Z, when the vibration generation device 2 is attached to the watch 1, the vibration generation device 2 can be easily held by gripping the large diameter part 46. As a result, the attachment of the vibration generation device 2 to the watch 1 can be easily performed.

In the vibration generation device 2 according to the present embodiment, the sliding ring 6 for making the rotor 3 smoothly rotate is attached between the restriction part 5 of the shaft 41 and the rotor 3. Accordingly, since the vibration generation device 2 can reduce a rotation resistance of the rotor 3, it is possible to easily generate a vibration. The same effects can be achieved due to the sliding ring 6 attached between the bearing 31 and the base part 42.

Since the outer diameter of the sliding ring 6 is set to be equal to or smaller than the outer diameter of an end surface that faces the sliding ring 6 in the bearing 31, it is possible to prevent the sliding ring 6 from coming in contact with a member (for example, the back yoke 32) other than the bearing 31 in the rotor 3. Accordingly, it is possible to prevent the occurrence of a sliding loss between the rotor 3 and the sliding ring 6 generated when the rotor 3 rotates.

Since the watch 1 according to the present embodiment includes the vibration generation device 2 whose thickness is reduced, it is possible to reduce the thickness of the watch 1. Further, since the cover of the vibration generation device of the related art is not disposed in the watch 1, a space around the rotor 3 is provided inside the watch 1, and thus watch components can be disposed in this space. Accordingly, it is possible to reduce the size of the watch 1.

According to the present embodiment, the rotor 3 is disposed in the hole 17 of the dial plate 15. Accordingly, it is possible to make a user recognize the rotating rotor 3. Accordingly, it is possible to communicate information visually while using vibration to the user. As a result, the watch 1 can improve a function of communicating information to the user. Moreover, in the watch 1, since part of the internal mechanism can be visually recognized when the hole 17 is provided, it is possible to improve the design properties of the watch 1.

According to the present embodiment, since at least part of the rotor 3 when viewed in the radial direction R is disposed in the hole 17 of the dial plate 15, the rotor 3 and the dial plate 15 are disposed in an overlapping manner when viewed in the radial direction R. Accordingly, compared to a configuration in which no rotor 3 is disposed in the hole 17 of the dial plate 15, an area occupied by the dial plate 15 and the vibration generation device 2 in the axial direction Z can be reduced. Accordingly, it is possible to reduce the thickness of the watch 1.

The rotor 3 may be disposed in a range in which it is not in contact with a hand 16 so that it projects from the dial plate 15 toward the hand 16 (the side of the glass 14). Accordingly, compared to a configuration in which the rotor 3 does not project from the dial plate 15 toward the hand 16, since the thickness of a portion that is positioned on the back side of the dial plate 15 within the rotor 3 is reduced, it is possible to further reduce the thickness of the watch 1.

Second Embodiment

A vibration generation device 102 according to a second embodiment of the present invention will be described.

Figure 3:
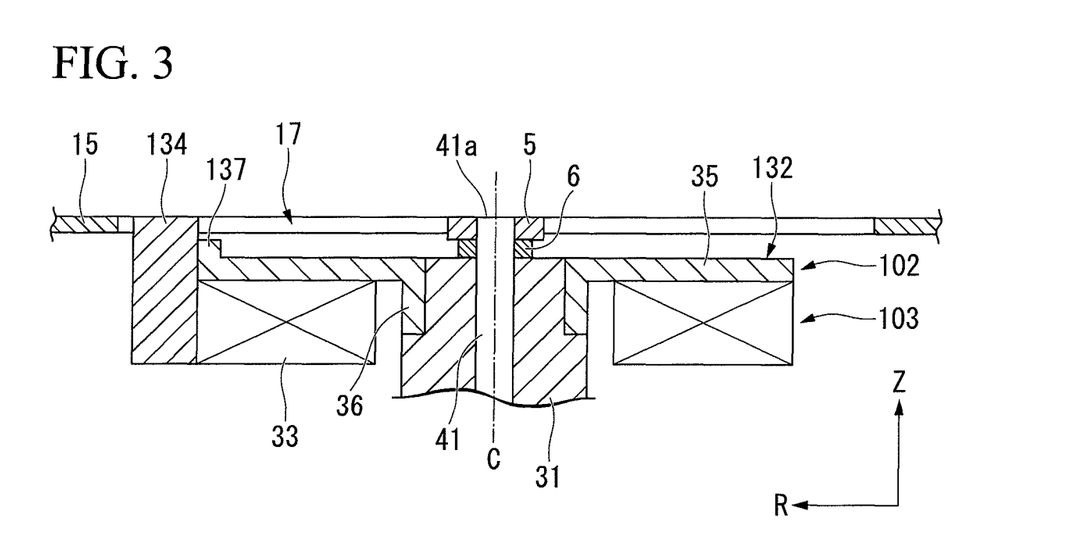
FIG. 3 is a schematic cross-sectional view of a vibration generation device according to a second embodiment of the present invention.

FIG. 3 is a schematic cross-sectional view of the vibration generation device 102.

As shown in FIG. 3, the vibration generation device 102 is a brushless vibration generation device. The vibration generation device 102 includes a rotor 103, the stator 4 (refer to FIG. 2), and the restriction part 5.

The rotor 103 includes the bearing 31, a back yoke 132, the magnet 33, and a weight 134. The back yoke 132 includes the yoke main body 35, the fitting tube 36, and an attachment part 137 that extends from an outer peripheral edge of the yoke main body 35, and these are integrally formed. The yoke main body 35 is disposed so that there is no step with respect to the bearing 31 in the radial direction R. The attachment part 137 extends from part of the outer peripheral edge of the yoke main body 35 toward one side in the axial direction Z (the upper side shown in FIG. 3). The attachment part 137 is formed corresponding to a shape of the weight 134 and formed in a semi-cylindrical shape with a central angle of about 180°.

The weight 134 is disposed more outwardly than the magnet 33 and the attachment part 137 in the radial direction R. The weight 134 is formed in a fan shape centered on the rotation axis C. The weight 134 is formed so that a central angle when viewed in the axial direction Z is, for example, about 180°. Accordingly, the center of gravity of the weight 134 is eccentric with respect to the rotation axis C. The weight 134 is fixed to the outer circumferential surface of the attachment part 137 by, for example, adhesion or welding.

The weight 134 is formed so that it projects to one side in the axial direction Z relative to the attachment part 137. The weight 134 is at the highest position in the rotor 103 with respect to the second end 41b of the shaft 41 (refer to FIG. 2). Since an installation range of the weight 134 increases, it is possible to enlarge the weight 134. Accordingly, a centrifugal force of the weight 134 exerted on the rotor 103 that rotates increases. As a result, it is possible to achieve both goals of reducing the thickness of the vibration generation device 102 and increasing a vibration. Since it is possible to enlarge the weight 134, copper that has a lower specific gravity than tungsten, is inexpensive, and is easily processed can be used as a material of the weight 134, and thus it is possible to reduce the cost.

The restriction part 5 is disposed at the same height as the rotor 103 with respect to the second end 41b of the shaft 41. That is, in the axial direction Z, an end of one side of the restriction part 5 is provided at the same position as an end of one side of the rotor 103. Accordingly, it is possible to reduce the thickness of the vibration generation device 102 since the restriction part 5 does not project further outwardly with respect to the rotor 103. As a result, it is possible to further reduce the thickness of the vibration generation device 102.

The first end 41a of the shaft 41 is disposed at the same height as the rotor 103 with respect to the second end 41b of the shaft 41. That is, in the axial direction Z, the first end 41a of the shaft 41 is provided at the same position as an end of one side of the rotor 103. Accordingly, it is possible to further reduce the thickness of the vibration generation device 102 since the shaft 41 does not project further outwardly with respect to the rotor 103. Accordingly, it is possible to further reduce the thickness of the vibration generation device 102.

Third Embodiment

A vibration generation device 202 according to a third embodiment of the present invention will be described.

Figure 4:
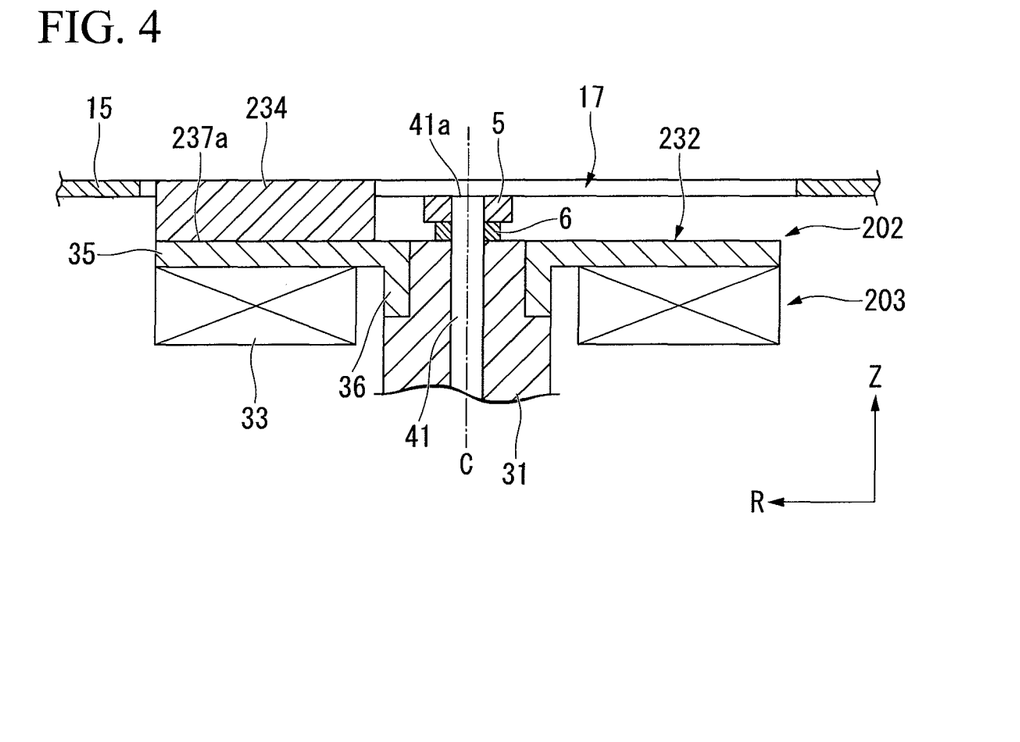
FIG. 4 is a schematic cross-sectional view of a vibration generation device according to a third embodiment of the present invention.

FIG. 4 is a schematic cross-sectional view of the vibration generation device 202.

As shown in FIG. 4, the vibration generation device 202 is a brushless vibration generation device. The vibration generation device 202 includes a rotor 203, the stator 4 (refer to FIG. 2), and the restriction part 5.

The rotor 203 includes the bearing 31, a back yoke 232, the magnet 33, and a weight 234. The back yoke 232 includes the yoke main body 35 and the fitting tube 36, and these are integrally formed. The yoke main body 35 is disposed so that there is no step with respect to the bearing 31 in the radial direction R.

The weight 234 is provided on a main surface 237a that faces one side (the upper side shown in FIG. 4) of the yoke main body 35 in the axial direction Z. The weight 234 is formed in a fan shape centered on the rotation axis C. The weight 234 is formed so that a central angle when viewed in the axial direction Z is, for example, about 180°. Accordingly, the center of gravity of the weight 234 is eccentric with respect to the rotation axis C. The weight 234 is at the highest position in the rotor 203 with respect to the second end 41b of the shaft 41 (refer to FIG. 2).

Since an installation range of the weight 234 increases, it is possible to enlarge the weight 234. Accordingly, a centrifugal force of the weight 234 exerted on the rotor 203 that rotates increases. As a result, it is possible to achieve both goals of reducing the thickness of the vibration generation device 202 and increasing a vibration. Since other operations and effects are the same as those described in the above described embodiments, descriptions thereof will be omitted.

Fourth Embodiment

A vibration generation device 302 according to a fourth embodiment of the present invention will be described.

Figure 5:
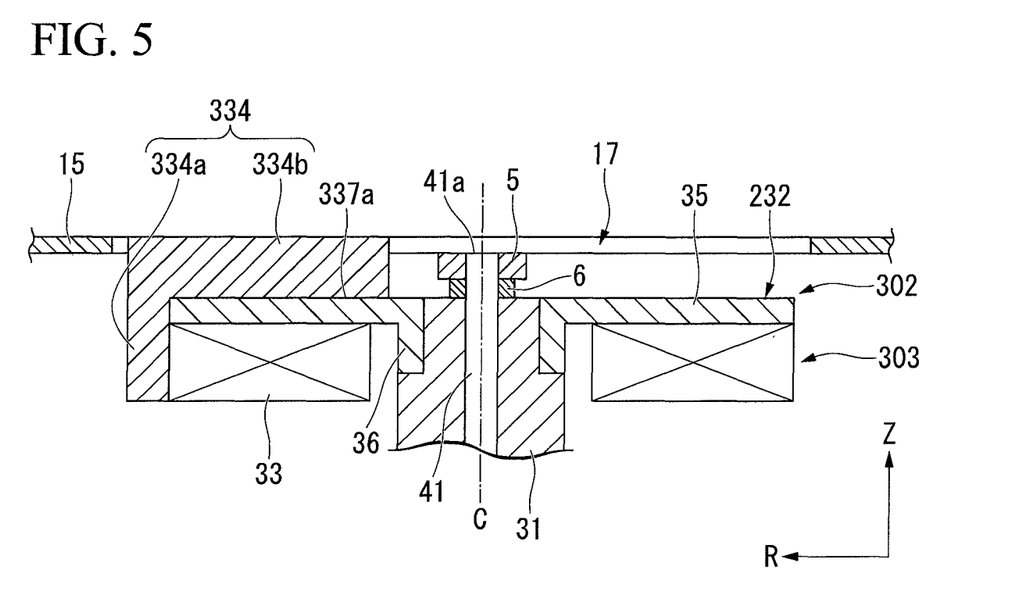
FIG. 5 is a schematic cross-sectional view of a vibration generation device according to a fourth embodiment of the present invention.

FIG. 5 is a schematic cross-sectional view of the vibration generation device 302.

As shown in FIG. 5, the vibration generation device 302 is a brushless vibration generation device. The vibration generation device 302 includes a rotor 303, the stator 4 (refer to FIG. 2), and the restriction part 5.

The rotor 303 includes the bearing 31, the back yoke 232, the magnet 33 and a weight 334. The weight 334 includes a first weight part 334a and a second weight part 334b. The first weight part 334a is provided outward from the magnet 33 and the back yoke 232 in the radial direction R. The first weight part 334a is formed in a fan shape centered on the rotation axis C. The first weight part 334a is formed so that a central angle when viewed in the axial direction Z is, for example, about 180°. The first weight part 334a is formed so that it projects to one side in the axial direction Z relative to the back yoke 232. The second weight part 334b is provided on a main surface 337a that faces one side (the upper side shown in FIG. 5) of the yoke main body 35 in the axial direction Z. The second weight part 334b is formed in a fan shape centered on the rotation axis C. The second weight part 334b is formed so that a central angle when viewed in the axial direction Z is, for example, about 180°. The second weight part 334b is disposed to overlap the first weight part 334a in the radial direction R, and is connected to the first weight part 334a. Accordingly, the center of gravity of the weight 334 is eccentric with respect to the rotation axis C.

The weight 334 is at the highest position in the rotor 303 with respect to the second end 41b of the shaft 41 (refer to FIG. 2). Accordingly, since an installation range of the weight 234 increases, it is possible to enlarge the weight 334. Accordingly, a centrifugal force of the weight 334 exerted on the rotor 303 that rotates increases. As a result, it is possible to achieve both goals of reducing the thickness of the vibration generation device 302 and increasing a vibration. Since other operations and effects are the same as those described in the above described embodiments, descriptions thereof will be omitted.

Fifth Embodiment

A vibration generation device 402 according to a fifth embodiment of the present invention will be described.

Figure 6:
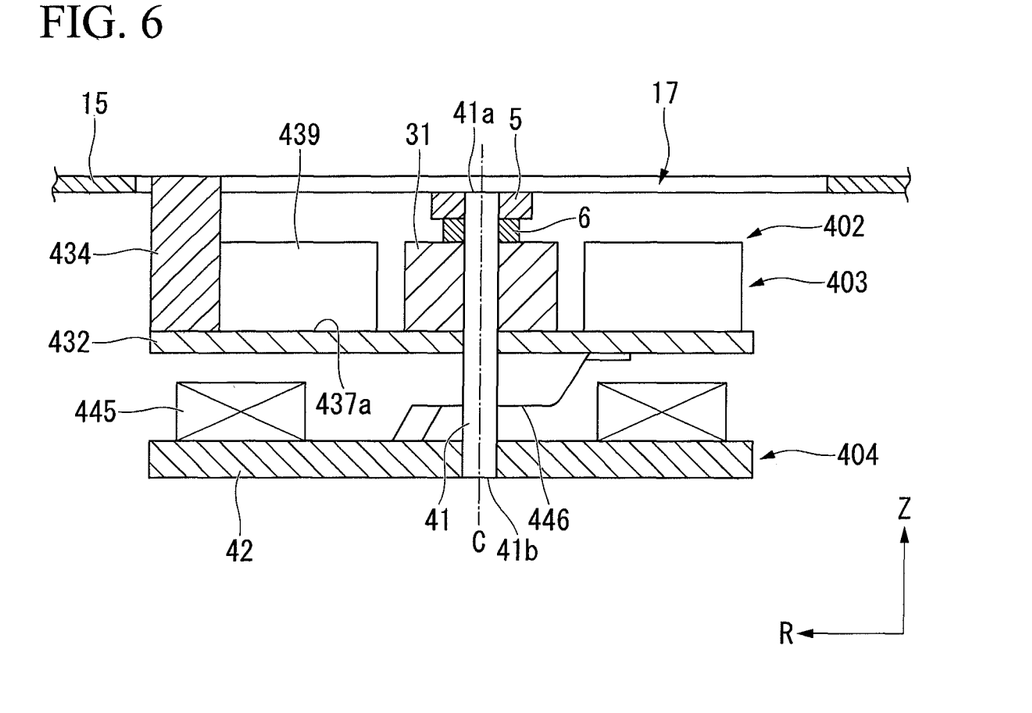
FIG. 6 is a schematic cross-sectional view of a vibration generation device according to a fifth embodiment of the present invention.

FIG. 6 is a schematic cross-sectional view of the vibration generation device 402.

As shown in FIG. 6, the vibration generation device 402 is a vibration generation device with a brush (vibration motor with a brush). The vibration generation device 402 includes a rotor 403, a stator 404, and the restriction part 5.

The rotor 403 includes the bearing 31, a circuit board 432, a coil 439, and a weight 434.

The circuit board 432 is fixed to an end of the other side (the lower side shown in FIG. 6) of the bearing 31 in the axial direction Z.

The coil 439 is provided on a main surface 437a that faces one side (the upper side shown in FIG. 6) of the circuit board 432 in the axial direction Z. The coil 439 is electrically connected to the circuit board 432.

The weight 434 is provided outward from the coil 439 in the radial direction R. The weight 434 is formed in a fan shape centered on the rotation axis C. The weight 434 is formed so that a central angle when viewed in the axial direction Z is, for example, about 180°. Accordingly, the center of gravity of the weight 434 is eccentric with respect to the rotation axis C. The weight 434 is fixed to the circuit board 432 by, for example, adhesion. The weight 434 is at the highest position in the rotor 403 with respect to the second end 41b of the shaft 41.

The stator 404 includes the shaft 41, the base part 42, a magnet 445, and a brush 446. The magnet 445 is provided on a main surface that faces the rotor 403 in the base part 42. The brush 446 is disposed between the base part 42 and the circuit board 432.

The brush 446 is electrically connected to the coil 439 through a commutator and the circuit board 432. The brush 446 is electrically connected to an external power supply. When a current is supplied from the external power supply to the coil 439 through the brush 446, the commutator, and the circuit board 432, the rotor 403 rotates about the rotation axis C. Accordingly, in the rotor 403 that rotates, a centrifugal force of the weight 434 causes generation of vibration.

As the same with the vibration generation device 2 according to the first embodiment, the vibration generation device 402 includes the restriction part 5 that restricts a movement of the rotor 403 in the axial direction Z. Accordingly, the vibration generation device 402 can prevent the rotor 403 from being separated from the shaft 41 without using the cover as in the vibration generation device of the related art. Accordingly, the vibration generation device 402 can be configured with a smaller thickness (dimension in the axial direction Z) compared to the vibration generation device of the related art since the cover is not disposed. Accordingly, it is possible to reduce the thickness of the vibration generation device 402. Since other operations and effects are the same as those described in the above described embodiments, descriptions thereof will be omitted.

Sixth Embodiment

A vibration generation device 502 according to a sixth embodiment of the present invention will be described.

Figure 7:
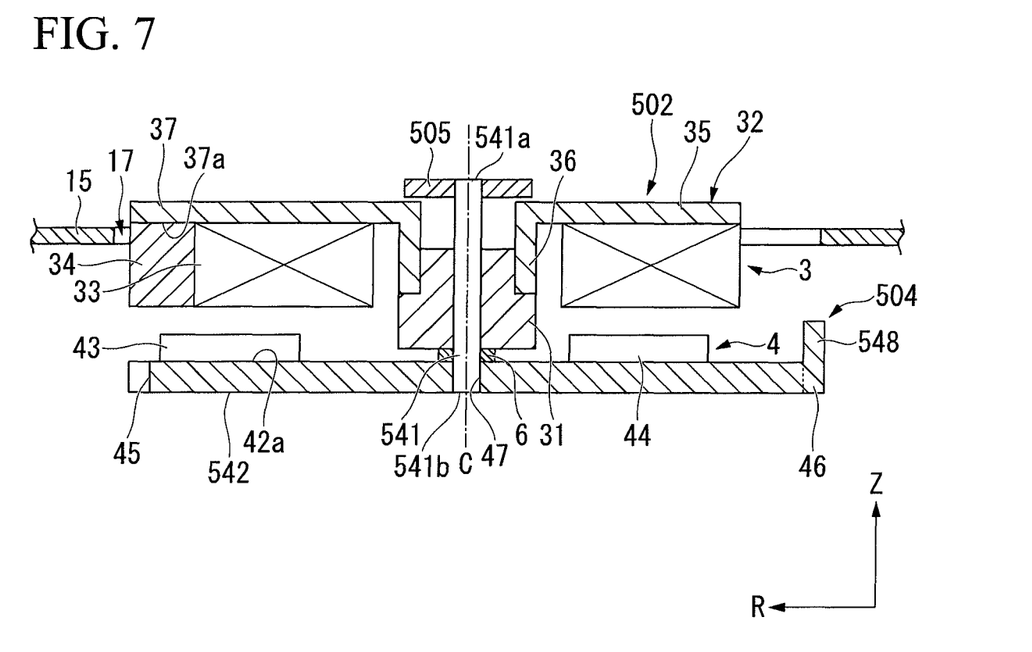
FIG. 7 is a schematic cross-sectional view of a vibration generation device according to a sixth embodiment of the present invention.

FIG. 7 is a schematic cross-sectional view of the vibration generation device 502.

The sixth embodiment shown in FIG. 7 is different from the first embodiment in that no sliding ring is disposed between a restriction part 505 and the bearing 31. The sixth embodiment is different from the first embodiment in that the restriction part 505 is provided to be capable of coming in contact with the back yoke 32.

As shown in FIG. 7, the vibration generation device 502 is a brushless vibration generation device. The vibration generation device 502 includes the rotor 3, a stator 504, and the restriction part 505.

The stator 504 includes a shaft 541, a base part 542, the coil 43, and the drive part 44. The shaft 541 is disposed coaxially with the rotation axis C. The shaft 541 is inserted and fitted into the bearing 31 so that it is relatively rotatable with respect to the bearing 31. Accordingly, the shaft 541 rotatably supports the rotor 3. The shaft 541 includes a first end 541a (one end) on one side (the upper side shown in FIG. 7) in the axial direction Z and a second end 541b (the other end) on the other side (the lower side shown in FIG. 7) in the axial direction Z. The first end 541a of the shaft 541 is formed to be higher than at least a height of the fitting tube 36 of the back yoke 32 with respect to the second end 541b of the shaft 541. That is, in the axial direction Z, the first end 541a of the shaft 541 is disposed on at least one side of the fitting tube 36 of the back yoke 32.

The base part 542 has a configuration in which a projection 548 is formed on the base part 42 according to the first embodiment described above. The projection 548 is disposed as extending from the large diameter part 46 toward the side of the rotor 3 in a thickness direction (the axial direction Z) of the base part 542. The projection 548 may continuously extend in an arc shape when viewed in the axial direction Z in a range in which the large diameter part 46 is provided in the circumferential direction or may be provided in part of a range in which the large diameter part 46 is provided. A plurality of projections 548 may be provided in fragments in a range in which the large diameter part 46 is provided. A minimum separation distance between the projection 548 and the rotation axis C is preferably larger than a maximum radius of the rotor 3. Accordingly, even the vibration generation device 502 is in a state in which a maximum radius part of the rotor 3 is positioned at the same position as the projection 548 in the circumferential direction, a gap is formed between the rotor 3 and the projection 548 when viewed in the axial direction Z.

The restriction part 505 restricts movement of the rotor 3 in the axial direction Z. The restriction part 505 is, for example, a nut. The restriction part 505 is fixed to the first end 541a of the shaft 541. The restriction part 505 restricts movement of the rotor 3 in the axial direction Z to one side (side opposite to the coil 43 of the stator 4). The restriction part 505 is disposed inward from the weight 34 of the rotor 3 in the radial direction R. The restriction part 505 is disposed at a higher position than the yoke main body 35 of the back yoke 32 with respect to the second end 541b of the shaft 541. The restriction part 505 is formed to be larger in diameter than an inner diameter of the fitting tube 36 of the back yoke 32. Part of the restriction part 505 faces the back yoke 32 in the axial direction Z. The restriction part 505 is formed so that it is separated from the yoke main body 35 of the back yoke 32 in the axial direction Z and is not in sliding contact with the back yoke 32 when the rotor 3 rotates.

The vibration generation device 502 is disposed in the hole 17 so that part of the rotor 3 and the shaft 541 projects from the dial plate 15 toward the glass 14 (refer to FIG. 1). In this state, the vibration generation device 502 is disposed so that it is not in contact with the hand 16. Accordingly, compared to a configuration in which the rotor 3 and the shaft 541 do not project from the dial plate 15 toward the glass 14, in the vibration generation device 502, since the thickness of a portion that is positioned on the back side of the dial plate 15 within the rotor 3 and the shaft 541 is reduced, it is possible to further reduce the thickness of the watch including the vibration generation device 502.

The base part 542 includes the projection 548 that is disposed to extend from the large diameter part 46 toward the side of the rotor 3 in the thickness direction of the base part 542. Accordingly, when the user grips the large diameter part 46, the projection 548 is easily caught by a finger, tweezers, or the like, and the vibration generation device 502 can be easily held. Accordingly, the attachment of the vibration generation device 502 to the watch can be easily performed.

Even when a maximum radius part of the rotor 3 is positioned at the same position as the projection 548 in the circumferential direction, a gap is formed between the rotor 3 and the projection 548 when viewed in the axial direction Z. Accordingly, independently of the position of the rotor 3, a finger, tweezers, or the like can be easily inserted on the side of the rotation axis C relative to the projection 548. Accordingly, it is possible to more easily hold the vibration generation device 502.

Part of the restriction part 505 faces the back yoke 32 in the axial direction Z. In such a configuration, when the rotor 3 moves in the axial direction Z, the back yoke 32 comes directly in contact with the restriction part 505. Accordingly, compared to a configuration in which movement of the bearing 31 is restricted by the restriction part, in the vibration generation device 502, the movement of the rotor 3 in the axial direction Z can be restricted at a position closer to the weight 34 (that is, a position away from the shaft 541 in the radial direction). Accordingly, it is possible to more reliably prevent the rotor 3 from being separated from the shaft 541.

Since the vibration generation device 502 according to the present embodiment is a brushless motor, the rotor 3 is attracted to the stator 504 due to a magnetic force exerted between the magnet 33 and the coil 43. Accordingly, the vibration generation device 502 may not include a restriction part that is directly in contact with the rotor 3 or always in contact with the rotor 3 through a sliding ring from a side opposite to the stator 504 with the rotor 3 therebetween. However, in order to prevent the rotor 3 from being separated from the shaft 541 when a shock is applied to the vibration generation device 502 or the like, the restriction part 505 that is separated from the rotor 3 in a normal state is preferably provided as in the present embodiment.

While the embodiments of the present invention have been described above in detail with reference to the drawings, specific configurations are not limited to the embodiments, and various design modifications within the scope without departing from the spirit and scope and of the present invention are included in the present invention.

In the embodiments described above, while an example that a nut is fixed to one end of the shaft 41 as the restriction part 5 is described, the present invention is not limited thereto. For example, the restriction part may be formed of an annular member, and the shaft 41 may be inserted and fixed there into by adhesion, welding, or the like, or the restriction part may be integrally formed with the shaft 41. A restriction part formed of a C ring may be caulked to the shaft 41 or the restriction part may be formed by a head of a screw that is engaged with the shaft 41.

In the embodiments described above, while an example of using the sliding ring 6 is described, the restriction part 5 may have slipperiness without using the sliding ring 6. For example, the restriction part 5 may be made of a resin or plating (nickel plating containing polytetrafluoroethylene) having slipperiness may be applied to the restriction part 5 made of a metal. Even in this case, the outer diameter of the restriction part 5 is preferably set to be equal to smaller than the outer diameter of an end surface that faces the restriction part 5 in the bearing 31. Accordingly, it is possible to prevent the occurrence of a sliding loss between the rotor and the restriction part 5 generated when the rotor rotates.

The case 13 and the dial plate 15 may be made of a transparent member and the watch 1 may be configured so that an internal structure can be visually recognized.

In the embodiments described above, while an example that the vibration generation device of the present invention is applied to the watch 1 is described, the vibration generation device of the present invention may be applied to electronic devices such as a mobile phone, a smart watch, a tablet, a VR head mounted display, and a handheld game console.

In addition, components in the above embodiments can be appropriately replaced with known components within the scope without departing from the spirit and scope of the present invention, and the above embodiments may be appropriately combined.

REFERENCE SIGNS LIST

1 Watch (electronic device)
2, 102, 202, 302, 402, 502 Vibration generation device
3, 103, 203, 303, 403 Rotor
5 Restriction part
15 Dial plate (visual recognition part)
17 Hole (opening)
32 Back yoke
34, 134, 234, 334, 434 Weight
41, 541 Shaft
41a, 541a First end (one end)
41b, 541b Second end (other end)
42 Base part (support plate)
45 Small diameter part
46 Large diameter part
548 Projection
C Rotation axis
R Radial direction
Z Axial direction

What is claimed is:
1. A vibration generation device comprising:
a rotor configured to be rotatable about a rotation axis, the rotor including a weight attached to a back yoke and having a center of gravity that is eccentric with respect to the rotation axis;
a shaft inserted into the rotor and configured to rotatably support the rotor; and
a restriction part disposed further inward than the weight in a radial direction, the restriction part being attached to one end of the shaft, and the restriction part restricting a movement of the rotor in an axial direction,
wherein the one end of the shaft and the restriction part are disposed at a first height with respect to an other end of the shaft, the first height of the shaft and the restriction part being equal to or lower than a larger value between a height of the weight and a height of the back yoke with respect to the other end of the shaft.

2. The vibration generation device according to claim 1, wherein the restriction part is disposed at or below a height of the rotor with respect to the other end of the shaft.

3. The vibration generation device according to claim 1, wherein one end of the shaft is disposed at or below a height of the rotor with respect to the other end of the shaft.

4. The vibration generation device according to claim 1, wherein part of the restriction part faces the back yoke in the axial direction.

5. The vibration generation device according to claim 1, wherein the weight is provided at a highest position in the rotor with respect to the other end of the shaft.

6. The vibration generation device according to claim 1, further comprising a support plate that supports the other end of the shaft,
wherein the support plate includes a small diameter part whose size from the rotation axis to an end of an outer side of the small diameter part in the radial direction is smaller than a maximum radius of the rotor.

7. The vibration generation device according to claim 1, further comprising a support plate that supports the other end of the shaft,
wherein the support plate includes a large diameter part whose size from the rotation axis to an end of an outer side of the large diameter part in the radial direction is larger than a maximum radius of the rotor.

8. The vibration generation device according to claim 7, wherein the support plate includes a projection that stands up from the large diameter part in a thickness direction of the support plate.

9. An electronic device comprising the vibration generation device according to claim 1.

10. The electronic device according to claim 9, further comprising:
a visual recognition part that is visually recognizable from outside the electronic device; and
an opening that is provided in the visual recognition part, wherein the rotor is disposed in the opening.

11. The electronic device according to claim 10, wherein part of at least one of the rotor and the shaft projects from the visual recognition part to the outside.

* * * * *

UNITED STATES PATENT AND TRADEMARK OFFICE
CERTIFICATE OF CORRECTION

PATENT NO. : 10,644,565 B2
APPLICATION NO. : 15/894612
DATED : May 5, 2020
INVENTOR(S) : Akihiro Iino and Masao Kasuga Page 1 of 1

It is certified that error appears in the above-identified patent and that said Letters Patent is hereby corrected as shown below:

On the Title Page

After Item (65), insert the following Item:
--(30) Foreign Application Priority Data,
Feb. 21, 2017 (JP) ............... 2017-029687
Nov. 20, 2017 (JP) .............. 2017-222993--

Signed and Sealed this
Eighteenth Day of August, 2020

Andrei Iancu
*Director of the United States Patent and Trademark Office*